July 18, 1961
K. E. DEVANTIER
2,992,793
AIRCRAFT PROVIDED WITH A DEVICE FOR HURLING
A LOCATION SIGNAL EMITTER
IN CASES OF ACCIDENTS
Filed Feb. 14, 1957
2 Sheets-Sheet 1
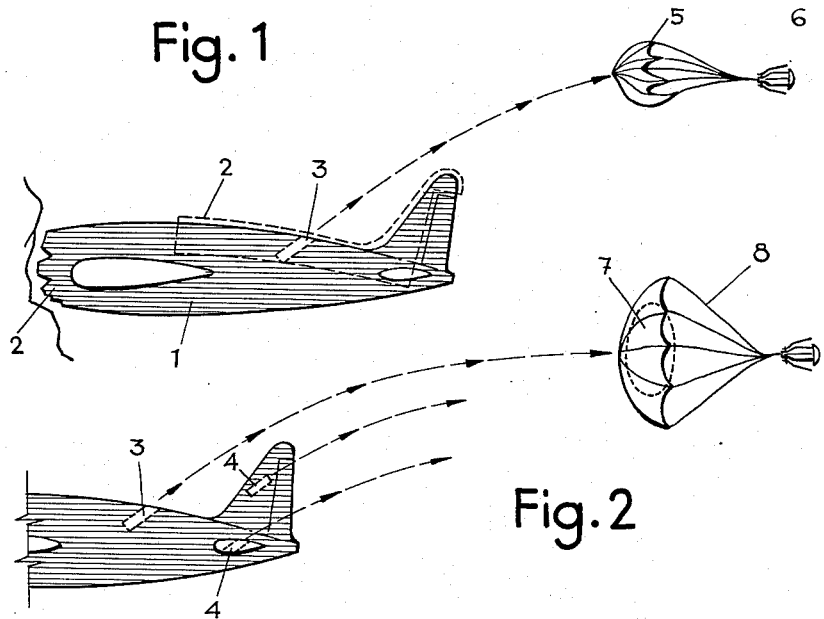
Fig. 1
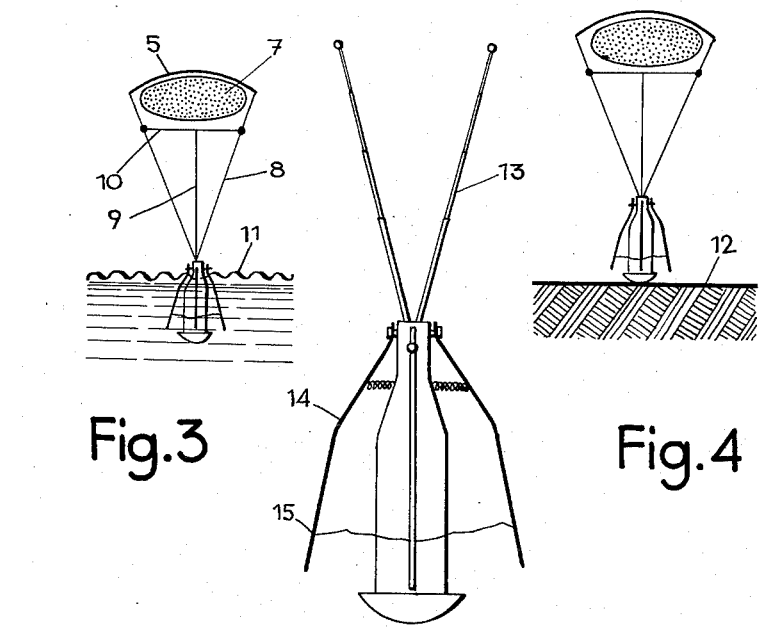
Fig. 2
Fig. 3
Fig. 4
Fig. 5
Inventor
Karl Edmund Devantier
by Michael S. Striker
agt

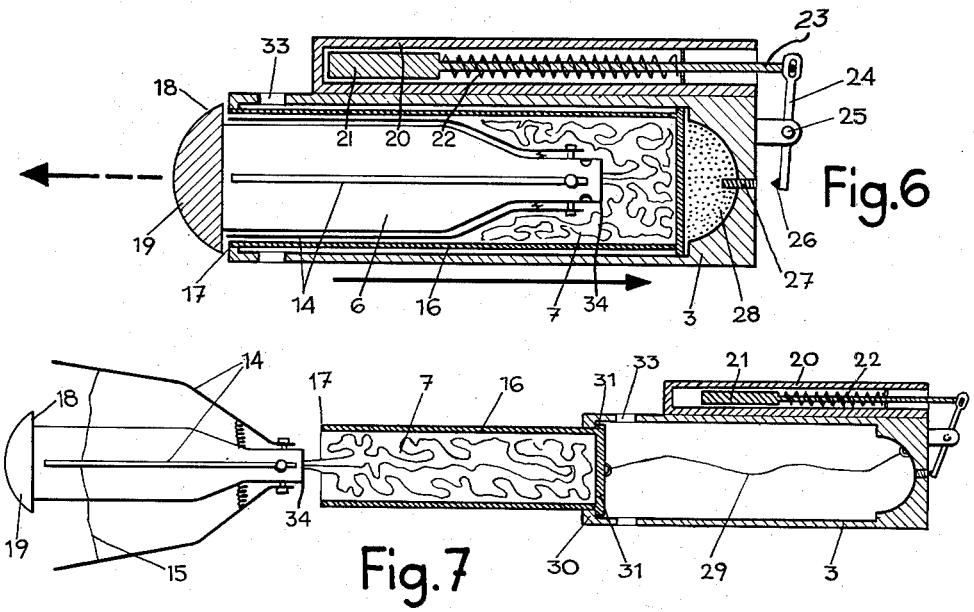

United States Patent Office 2,992,793
Patented July 18, 1961

2,992,793
AIRCRAFT PROVIDED WITH A DEVICE FOR HURLING A LOCATION SIGNAL EMITTER IN CASES OF ACCIDENTS
Karl Edmund Devantier, Felipe V, 6, 3, Madrid, Spain
Filed Feb. 14, 1957, Ser. No. 640,113
Claims priority, application Spain Feb. 17, 1956
4 Claims. (Cl. 244—1)

The present invention relates to an aircraft provided with a device for hurling a location signal emitter in cases of accidents.

It is a well known fact that unfortunately during accidents to aircraft that crash in solitary territory and on dull days, in almost every instance their radio equipment is at the same time of the accident placed out of order. This equipment is destroyed either through the impact or by the resultant fire, for which reason the survivors in the majority of cases dispose of no means whatsoever to enable them to emit signals indicating their position in order to guide the search and rescue expeditions.

The present invention tends to provide for all such cases of accidents, even under the most unfortunate circumstances when there are no survivors, a device to enable the location of a crashed aircraft by the reception of radio signals that are emitted by means of an apparatus which at the moment of an impact is launched from the aircraft to a reasonable distance so as to ensure that it will fall outside the reach of any flames but which, nevertheless, is kept within the area of the accident, so that the crashed aircraft can easily be located by day, night, fog, heavy clouds or snow.

The fundamental idea consists in firing or hurling by means of a mechanism, such as a catapult or any other appropriate device, a radio equipment provided with batteries in order to immediately broadcast predetermined signals as also the characteristics of the aircraft itself at the very moment in which the accident occurs. The referred to automatic hurling mechanism or catapult is applied to that part of the aircraft which, in accordance with statistics concerning accidents, is such where there exists the least probability of its impact with the ground. This, in the majority of cases will be the rudder i.e. tail unit, or the upper portion of the craft, as hardly any cases are known in which an aircraft has crashed on to its tail unit, or upside down.

The catapult is firmly secured in an appropriate position and mounted thereto in such a manner as to ensure its immediate launching action, that can be produced either by means of strong springs, by compressed air, or by an explosive discharge. The rigid supports of the aircraft structure will strike against said catapult transmitting thereto such force which at all events will suffice to operate same, so that within the fraction of a second after the first impact of the craft with the ground or like obstacle, the radio equipment will be hurled into space to a convenient distance from the aircraft.

To this effect said radio equipment is contained inside a kind of projectile and protected against shocks by means of a thick layer of sponge rubber or any other suitable shock absorbing elements. The electric connection between the radio set and its feed elements, for example dry batteries, in its normal of rest position remains cut out and will be put in circuit therewith in virtue of the launching action of the catapult by means of an automatic device or a fuse, during its descent at the moment of striking against an obstacle.

Provision is also made for the event of accidents occurring on routes over seas and lakes, and for such cases use is made of a float or a small globe packed inside the referred to projectile together with a small bottle of compressed hydrogen that is likewise opened automatically by means of a device operated in virtue of the launching action of the catapult, or by a percussion fuse. The injection of air or gas is thereby initiated at the moment of hurling the float or globe into space, which will thus start to open up within a few seconds during the descent of the emitter-projectile. The globe, even when only half spread, will at all times serve as a rudder and brake and will thus enable the projectile to strike the ground or surface of the water in the desired position. The space between the radio equipment and the globe can be utilized to apply a length of antenna or aerial. Said globe will float in the air and should be of an appropriate volume to enable same to carry the bottle of compressed gas and a length of aerial. Preferably, the projectile will be cylindrical in shape, having one end heavier than the other so that it will be held upright in the water as a floating bottle with its neck above the surface and from which the aerial will thus lead toward the globe.

The technical realization of the essence of the present invention offers no difficulty whatsoever, as long range portable broadcasting sets operated by batteries, are already well known.

The only, and easily solved problem in this instance resides in mounting the elements constituting an appropriate radio equipment inside a tubular container with a diameter of say twelve inches, as a projectile that is intended to be hurled to a distance of about one hundred yards at the utmost while carrying a weight of only a few pounds, can be launched without much trouble. An excellent shock absorbing material is the so-called sponge rubber or any other soft plastic mass, whereas the external covering layer can likewise be made of a plastic material of the stratified ester type, or of any other suitable kind of polyethylene. All these materials are already well known and the utilization thereof offers no difficulty whatsoever. Several conventional types of launching devices, when disposing of powerful forces produced at the moment of the impact, can also be applied to the object of this invention so that no further reference thereto is required, while finally, the system of inflating life boats or globes with gases contained in small bottles apt to open spontaneously in virtue of the excess of force produced by the impact of the aircraft at the moment of the accident or upon the emitter-projectile striking against the ground or the surface of the water, is also well known.

It is therefore that the technical realization requires no further technical knowledge than such as is within the reach of any qualified engineer, whereas the proper combination of all the aforementioned elements will result in an entirely new and hitherto ignored device that will serve to save many lives, while furthermore enabling the recovery of highly priced elements such as the remains of experimental aircraft and rockets which thereby can be located and recovered rapidly.

The accompanying drawings illustrate the essence of the invention as also several nonlimited examples of embodiments.

FIG. 1 is a diagram representing an aircraft that has struck an obstacle with its nose, which was immediately destroyed and likewise diagrammatically shows the moment of launching the radio equipment.

FIG. 2 represents a phase, a few seconds later, when the parachute and the globe have opened up.

FIG. 3 shows the emitter device on the surface of the water.

FIG. 4 shows the emitter device dropped on to the ground.

FIG. 5 represents the possible application of a telescopic aerial of the conventional type as applied to other radio sets that are dropped from aircraft for different purposes.

FIG. 6 is the possible embodiment of a catapult apt to be mounted to an aircraft.

FIG. 7 represents the moment of firing the catapult shown in the example of FIG. 6.

FIG. 8 shows the radio equipment in flight after having left its container.

FIGS. 9 and 10 are details of a possible technical solution applicable to the shell or casing containing the emitter-projectile together with its parachute and globe.

In all figures, like numbers correspond to identical parts or elements.

The numeral 1 represents the rear portion of an aircraft; 2 shows in broken lines, such parts of an aircraft to which a catapult can be mounted; 3 by way of an example, indicates the location of a catapult; 4 are other very appropriate parts for the mounting of a catapult in larger aircraft. The numeral 5 represents the motion retarding means in the form of a parachute and 6 the radio equipment. The numeral 7 indicates the globe and 8 the suspension cords that are applied thereto; 9 is a length of aerial and 10 an aerial which adopts an almost horizontal position when the globe acquires the elongated shape as shown in FIGS. 3 and 4.

The numeral 11 represents the water level of either a sea or lake and 12 the ground level; 13 are telescopic aerials that are launched as soon as the emitter set strikes against an obstacle; 14 are spreaders or leg members and 15 the cords that are applied thereto so that the emitter can hook on to the branches of trees or can be held to the peaks of rocks and the like. The leg members 14 are permanently biased in a direction away from the nose portion 19 by suitable resilient elements best shown in FIGS. 7 and 8.

The numeral 16 is a sleeve like receptacle for the accommodation of the projectile for the location signal emitter; 17 is the front edge of said sleeve; 18 represents the marginally arranged abutment means in the form of a rim of the projectile-emitter upon which the edge 17 operates at the moment of launching same; 19 is the, preferably weighted, nose portion of the projectile that can be applied as a container for a dry battery; 34 is the tail portion of the projectile. The numeral 31 is the base or bottom end of the sleeve which receives the propelling force. The numeral 20 is a guide for the weight 21 that is freely suspended and capable of traveling in the direction of flight as soon as a sudden and strong deceleration is applied thereto, thus annulling the normal resistance of the coil spring 22, in which case the extension 23 of the weight 21, in the shape of a rod, will operate upon a lever mechanism 24 and 26 that pivots around the spindle 25 and will thus strike, as a trigger, against the detonator 27 of the explosive charge 28, which in turn will operate upon the aforementioned base portion 31 of the sleeve 16, thereby ejecting same and simultaneously therewith, the emitter projectile 6, while exerting its entire pressure upon the referred to rim 18.

Thereafter the sleeve is retarded or braked, as is symbolically indicated by the cable 29 (see FIG. 7) or by a combination of slots and salients, as shown in FIGS. 9 and 10, wherein FIG. 9 represents the base 31 of the sleeve 16 and two or more salients 32, and FIG. 10 the external rim 30 of the launching tube 3. This tube 3 constitutes a means for reciprocably receiving the sleeve 16 so that the latter may move between the positions of FIGS. 6 and 7. The numeral 33 indicates the lateral bores for the escape of the explosion gases.

The sleeve 16 is inserted by allowing the salients 32 to coincide with the abutment means in the form of an external rim 30 and thereafter rotating same slightly thus locating same behind the internal rim of the launching tube where, after having fired the sleeve, it will be stopped and retarded with respect to the projectile in such a manner that only the emitter-projectile is allowed to advance, so that the parachute will open up in a proper way upon leaving the sleeve (see FIGS. 7 and 8). The marginal arranged abutment means cooperating with the abutment means, assisted by cable 29, if necessary, comprises stop means for the sleeve 16.

The full arrow in FIG. 6 indicates the direction of flight of the aircraft, whereas the broken arrow indicates the direction of flight of the radio equipment after being launched.

Theoretically, a launching action at the moment of a catastrophic deceleration can be accomplished by several means such as by electrical, hydraulic or compressed gas systems, however, in practice there always exists the possibility of damages occurring to the installations on board, as a fire can cause a breakdown of such services by cutting the electric current or the conduits of pressure fluids, in which case such launching would be provoked in the air and possibly at a distance of many miles from the actual area of the accident.

There are other theoretically perfect solutions by the use of the aforementioned means, however, heretofore the mechanical solution for a launching action in the described form, was shown by way of an example, as it is considered the safest and simplest method, admitting variations without dissenting from its fundamental essence which resides in the combination of the automatic firing and launching elements in an organic assembly thus constituting a unit capable of being mounted in the appropriate place and independent of the installations on board.

By the present invention no protection is sought for any especial type of catapult, or a determined type of projectile, nor a certain type of launching system, or of floating globes, but merely the combination of all these elements that are destined to hurl an emitter set at the precise moment of an accident occurring to an aircraft or the like and to cause same to immediately broadcast signals in a likewise known wavelength at the very moment it is launched and separated from the crashed aircraft or the like.

What I claim is:

1. In an aircraft, an apparatus for automatically ejecting to a point distant from the aircraft a projectile containing a location signal emitter in response to sudden deceleration of the aircraft, said apparatus comprising, in combination, a projectile including a location signal emitter, said projectile comprising a weighted nose portion, abutment means located at a point close to said nose portion, a tail portion spaced from said nose portion, and motion retarding means attached to said tail portion; a substantially sleeve like receptacle for said projectile, said receptacle having an open end and a closed end with said projectile received in the receptacle in such a way that the open end of the receptacle is adjacent to said abutment means and that said tail portion and said motion retarding means are located nearer to said closed end; and launching means mounted on the aircraft for automatically ejecting said projectile from said receptacle in response to sudden deceleration of the aircraft, said launching means comprising means for reciprocably receiving said receptacle, energy imparting means responsive to a sudden deceleration of the aircraft for accelerating said receptacle in a direction to move said open end into motion transmitting engagement with said abutment means and to thereby impart a forward thrust to said projectile, and means for preventing movement of said receptacle with said projectile upon a given movement of said projectile whereby the projectile is ejected from said receptacle and descends to the ground with its nose portion leading and at a rate of speed determined by said motion retarding means.

2. In an aircraft, an apparatus for automatically ejecting to a point distant from the aircraft a projectile containing a location signal emitter in response to sudden deceleration of the aircraft, said apparatus comprising, in combination, a bottle shaped projectile including a location signal emitter, said projectile comprising a weighted nose portion, abutment means located at a point close to said nose portion, a bottleneck shaped tail portion spaced from said nose portion, and motion retarding means attached to said tail portion; a substantially sleeve like receptacle for said projectile, said receptacle having an open end and a closed end with said projectile received in the receptacle in such a way that the open end of the receptacle is adjacent to said abutment means and that said tail portion and said motion retarding means are located nearer to said closed end; and launching means mounted on the aircraft for automatically ejecting said projectile from said receptacle in response to sudden deceleration of the aircraft, said launching means comprising means for reciprocably receiving said receptacle, energy imparting means responsive to a sudden deceleration of the aircraft for accelerating said receptacle in a direction to move said open end into motion transmitting engagement with said abutment means and to thereby impart a forward thrust to said projectile, and means for preventing movement of said receptacle with said projectile upon a given movement of said projectile whereby the projectile is ejected from said receptacle and descends to the ground with its nose portion leading and at a rate of speed determined by said motion retarding means.

3. In an aircraft, an apparatus for automatically ejecting to a point distant from the aircraft a projectile containing a location signal emitter in response to sudden deceleration of the aircraft, said apparatus comprising, in combination, a projectile including a location signal emitter, said projectile comprising a weighted nose portion, abutment means located at a point close to said nose portion, a tail portion spaced from said nose portion, motion retarding means attached to said tail portion, and bracing means comprising a plurality of substantially radially arranged leg members each having an end articulately connected to said tail portion and each extending toward said nose portion, and resilient means for biasing said leg members in directions to pivot about said ends thereof and away from said nose portion; a substantially sleeve like receptacle for said projectile, said receptacle having an open end and a closed end with said projectile received in the receptacle in such a way that the open end of the receptacle is adjacent to said abutment means, that said tail portion and said motion retarding means are located nearer to said closed end, and that said leg members are pivoted against the bias of said resilient means; and launching means mounted on the aircraft for automatically ejecting said projectile from said receptacle in response to sudden deceleration of the aircraft, said launching means comprising means for reciprocably receiving said receptacle, energy imparting means responsive to a sudden deceleration of the aircraft for accelerating said receptacle in a direction to move said open end into motion transmitting engagement with said abutment means and to thereby impart a forward thrust to said projectile, and means for preventing movement of said receptacle with said projectile upon a given movement of said projectile whereby the projectile is ejected from said receptacle and descends to the ground with its nose portion leading and at a rate of speed determined by said motion retarding means, said leg members pivoted away from said nose portion under the bias of said resilient means when the projectile is ejected from said receptacle.

4. In an aircraft, an apparatus for automatically ejecting to a point distant from the aircraft a projectile containing a location signal emitter in response to sudden deceleration of the aircraft, said apparatus comprising, in combination, a projectile including a location signal emitter, said projectile comprising a weighted nose portion, abutment means located at a point close to said nose portion, a tail portion spaced from said nose portion, motion retarding means attached to said tail portion, and bracing means comprising a plurality of substantially radially arranged leg members each having an end articulately connected to said tail portion and each extending toward said nose portion, resilient means for biasing said leg members in directions to pivot about said ends thereof and away from said nose portion, and cord means connected to and extending between said leg members; a substantially sleeve like receptacle for said projectile, said receptacle having an open end and a closed end with said projectile received in the receptacle in such a way that the open end of the receptacle is adjacent to said abutment means, that said tail portion and said motion retarding means are located nearer to said closed end, and that said leg members are pivoted against the bias of said resilient means; and launching means mounted on the aircraft for automatically ejecting said projectile from said receptacle in response to sudden deceleration of the aircraft, said launching means comprising means for reciprocably receiving said receptacle, energy imparting means responsive to a sudden deceleration of the aircraft for accelerating said receptacle in a direction to move said open end into motion transmitting engagement with said abutment means and to thereby impart a forward thrust to said projectile, and means for preventing movement of said receptacle with said projectile upon a given movement of said projectile whereby the projectile is ejected from said receptacle and descends to the ground with its nose portion leading and at a rate of speed determined by said motion retarding means, said leg members pivoted away from said nose portion under the bias of said resilient means when the projectile is ejected from said receptacle.

References Cited in the file of this patent

UNITED STATES PATENTS

| | | |
|---|---|---|
| 496,854 | Capazza | May 9, 1893 |
| 1,347,157 | Hanson | July 20, 1920 |
| 1,416,828 | Holmes | May 23, 1922 |
| 1,861,784 | Brown et al. | June 7, 1932 |
| 1,936,595 | Goodard | Nov. 28, 1933 |
| 2,441,133 | Brady | May 11, 1948 |
| 2,470,783 | Mead | May 24, 1949 |
| 2,473,050 | Camp | June 14, 1949 |
| 2,519,553 | Faulkner | Aug. 22, 1950 |
| 2,555,867 | Bennett | June 5, 1951 |
| 2,587,564 | Williams | Feb. 26, 1952 |
| 2,628,307 | Lloyd et al. | Feb. 10, 1953 |
| 2,822,207 | Steinmetz et al. | Feb. 4, 1958 |

FOREIGN PATENTS

| | | |
|---|---|---|
| 179,936 | Switzerland | Mar. 2, 1936 |